Patented Mar. 11, 1952

2,588,449

UNITED STATES PATENT OFFICE 2,588,449

LEVULOSE DIHYDRATE

Frank E. Young, Berkeley, and Francis T. Jones, El Cerrito, Calif., assignors to the United States of America as represented by the Secretary of Agriculture No Drawing. Application March 3, 1950, Serial No. 147,574

17 Claims. (Cl. 127—30)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to levulose (also known as fructose) and its derivatives.

One object of this invention is the provision of a novel compound, namely, levulose dihydrate, $C_6H_{12}O_6 \cdot 2H_2O$.

Another object of this invention is the provision of novel methods for isolating levulose, as its dihydrate, from solutions containing levulose and other sugars, particularly dextrose.

Further objects of this invention will be obvious from the disclosure herein.

Levulose is a useful material for sweetening purposes in all types of food and beverage preparations as it is 50% sweeter than sucrose. However, levulose is not used commercially because of the expense and difficulty of isolating it from the other sugars which accompany it in natural sugar mixtures or in invert sugar. Invert sugar, a mixture of equal parts of levulose and dextrose, made by hydrolysis of sucrose is the most convenient source of levulose. One known method of isolating levulose involves adding calcium hydroxide to an aqueous solution of invert sugar to precipitate most of the levulose as calcium levulate. This compound is filtered off, suspended in water and treated with carbon dioxide to release the levulose. The precipitate of calcium carbonate formed in the reaction is removed by filtration. The resulting solution of levulose, which still contains about 1 part dextrose per 10 parts levulose, is concentrated to at least 90% solids then cooled to 29° C. and the anhydrous levulose allowed to crystallize out. The mother liquor remaining is then re-concentrated and re-crystallized. The processes of concentration and crystallization are repeated several times until the concentration of dextrose rises to such a high level as to prevent further crystallization of anhydrous levulose. This known process has many disadvantages as will be explained hereinafter.

It has now been found that levulose can be isolated in high yields and in pure form if it is isolated as its dihydrate, a compound not heretofore known. In accordance with our process, the invert sugar or other raw material is first treated by conventional means to increase the levulose to dextrose ratio. In some cases, such preliminary purification may be omitted. The solution is then concentrated and cooled to a temperature not higher than about 20° C. and seeded with a small amount of levulose dihydrate crystals from a previous batch. These seeds act as nuclei and the crystals of levulose dihydrate separate rapidly from the solution. The mother liquor remaining after the crystals are removed can be re-concentrated and re-crystallized to obtain further crops of levulose dihydrate.

The advantages of our procedure over that previously known can be explained as follows:

(1) The crystallization of levulose dihydrate is rapid as compared with the crystallization of anhydrous levulose. Thus in crystallizing the dihydrate the mixture reaches equilibrium in 12 hours or less. In the crystallization of anhydrous levulose at least 3 days are required to reach 65% of equilibrium and even after 1 week the system is still not completely in equilibrium.

(2) In the crystallization of levulose dihydrate, substantial concentrations of dextrose (up to about 18%) do not interfere with the crystallization of the dihydrate, whereas in crystallizing anhydrous levulose even small proportions of dextrose will retard crystallization of anhydrous levulose and larger concentrations of dextrose will completely prevent crystallization of anhydrous levulose. Thus in our process, the initial treatment of the raw material to increase the levulose to dextrose ratio need not be as thorough as in the known process.

(3) In our process, the levulose dihydrate crystallizes out of solution in the form of large crystals which are easy to separate from the mother liquor. In the crystallization of anhydrous levulose, this material separates in such small crystals that it is difficult to separate from the mother liquor and difficult to wash properly.

(4) The solubility of levulose dihydrate decreases with decreasing temperature at a much greater rate than does the solubility of anhydrous levulose. This fact gives rise to several important advantages. In the first place, the amount of levulose dihydrate which will crystallize out upon cooling the concentrated solution is greater than the amount of anhydrous levulose which could be expected to crystallize out. Thus at minus 4° C. anhydrous levulose is soluble to the extent of 74% whereas levulose dihydrate is soluble only to the extent of 50% (calculated on the anhydrous basis). The difference in yield which can be obtained can be readily appreciated if one considers 100 lbs. of solution containing 80 lbs. of levulose. If this solution were cooled to minus 4° C., only 23 lbs. of anhydrous levulose would be crystallized out whereas if the solution were cooled to minus 4° C. and seeded with levulose dihydrate crystals in accordance with this invention, 90 lbs. of levulose dihydrate (equivalent to 75 lbs. of anhydrous levulose) would be crystallized out. The low solubility of levulose dihydrate gives rise to another advantage in that the initial amount of levulose in the solution need not be as high when the dihydrate is crystallized as when anhydrous levulose is crystallized. Thus one can see from the above example that if anhydrous levulose is to be crystallized at minus 4° C., one must start with a solution containing over 74% levulose. However in crystallizing the dihydrate, the concentration of the solution need only be over 50%. Obviously, in our process there is a saving in evaporation costs as the solution need not be so highly concentrated as in the case with crystallization of levulose. The fact that the dihydrate will crystallize from lower concentrated solutions also has the advantage that one is dealing with a less viscous solution and hence separation of the dihydrate crystals is easier and more efficient.

(5) The process in accordance with this invention is so efficient that one can utilize it to crystallize levulose dihydrate from mother liquors from which anhydrous levulose can no longer be obtained by known procedures. Thus, for example, a liquor containing 67% levulose and 17.5% dextrose could not be used for crystallization of anhydrous levulose. If such a solution were concentrated and cooled, both anhydrous levulose and dextrose would crystallize out. However if the solution were diluted with water to 50% levulose and 13% dextrose, cooled to the temperature range herein disclosed, and seeded with levulose dihydrate, approximately 40% of the levulose would crystallize out as pure levulose dihydrate.

(6) Our process yields levulose dihydrate in pure form; the crystals are snow-white in color and when dissolved in water form colorless solutions. The anhydrous levulose isolated by known processes tends to occlude impurities from the liquid phase so much so that when the product is dissolved in water it forms an amber solution.

In isolating levulose in accordance with this invention a solution is first prepared which is proper for the crystallization procedure. Several factors are to be considered in obtaining this solution for crystallization. In the first place, the concentration of dextrose therein should not be too high or dextrose hydrate will crystallize out together with levulose dihydrate. To prevent this, the solution should not contain over 18% dextrose. The type and amount of refining which may be necessary depends of course on the composition of the starting material. One suitable method for decreasing the dextrose content is the calcium hydroxide treatment referred to above. Another method involves crystallizing out part of the dextrose content as anhydrous dextrose or as dextrose monohydrate. It is evident that any of the known methods for decreasing the concentration of dextrose can be applied to obtain the desired levulose to dextrose ratio. Another factor is that the levulose concentration in the solution should be above 36.5%. If only small concentrations of dextrose are present, then the levulose concentration should be somewhat higher, say, over 45%, since the solubility of levulose dihydrate increases as the dextrose concentration decreases. The levulose concentration may be much higher than these minimum values and in general we prefer to use concentrations of about 50% to about 70% whereby one deals with solutions which are not too viscous and hence separation of dihydrate crystals, washing, etc. are expeditious and efficient. It is obvious that the proper solution for crystallization can be established by applying such well known unit processes as dissolving of raw material (if in solid form), evaporative concentration, calcium hydroxide treatment and other procedures well known in the art. A novel method which may be used to increase the levulose concentration in the solution is based on the fact that at temperatures below the levulose dihydrate-ice eutectic (approximately minus 9.5° C.), ice will crystallize more rapidly than will levulose dihydrate. Thus to apply this principle, the solution is cooled to a temperature below minus 9.5° C., say, about minus 10° C. to about minus 20° C., preferably about minus 16 C., and seeded with ice crystals taking care not to contaminate it with either anhydrous levulose or levulose dihydrate crystals. After agitating for a short time, about one-half hour, to permit maximum crystallization of ice, the ice is removed by filtration or centrifugation leaving a solution of increased levulose concentration. This process may be repeated if necessary to obtain the desired concentration of levulose.

Having obtained a solution of the desired concentration of levulose and dextrose, the next step is to cool the solution to a temperature range at which levulose dihydrate will crystallize out of solution. The temperature for crystallization can be from about 20° C. to about minus 9° C. The particular temperature depends on the concentration of levulose in solution and on the yield of levulose desired. Thus the upper limit of 20° C. is suitable only where the levulose concentration is above about 63%. On the other hand the lower limit of minus 9° C. is suitable where the levulose concentration is above about 36.5%. In any case, the increasing yields of levulose dihydrate are obtained as the temperature is lowered because the solubility of this compound decreases sharply with decreasing temperature. Thus in general we prefer to use a crystallizing temperature of from about minus 5° C. to about minus 9° C. In this temperature range high yields are obtained yet the solution is not too viscous and moreover the possibility of ice formation is minimized. After having cooled the solution to the desired crystallizing temperature, we then add a very small amount of levulose dihydrate crystals from a previous run. The amount used is not critical just so long as there are some crystals present to act as nuclei for promoting crystallization of the dihydrate. The temperature is maintained within the range stated (about 20° C. to about minus 9° C.) while the crystallization takes place. It is generally preferable to agitate the material during crystallization to promote this action. In general crystallization is allowed to take place over a sufficient period of time (about 12–24 hours) to allow the system to come to equilibrium. The crystals of levulose dihydrate are then separated by suitable means such as filtration or centrifugation. If necessary, the crystals are washed with alcohol, cold water, or water saturated with levulose dihydrate. The crystals are then dried in air or vacuum. Obviously the separation, washing, and drying steps must all be carried out under such temperature conditions (about 20° C. to about minus 9° C.) to prevent melting of the levulose dihydrate crystals. The mother liquor can then be concentrated to bring the concentration of levulose back to 40% or over and the process repeated. The concentration and crystallization can obviously be repeated as many times as necessary until the ratio of levulose to dextrose becomes too low. When this point is reached the liquor may be added to a fresh batch of invert sugar for the initial concentration of levulose or separately treated by the calcium hydroxide method or other known technique to increase the ratio of levulose to dextrose.

We have also discovered several novel methods of treating the mother liquor from the dihydrate crystallization. These methods may be used to re-concentrate the mother liquor or to obtain further amounts of levulose dihydrate. The novel methods are based on two principles: One is that at temperatures below the levulose dihydrate-ice eutectic (approx. minus 9.5° C.), ice will crystallize more rapidly than will levulose dihydrate; the other is that levulose dihydrate dissolves more slowly than ice and has a greater density than ice. To apply the first method, the mother liquor is cooled to below the eutectic temperature, say, to about minus 10° C. to about minus 20° C., preferably about minus 16° C., and seeded with ice crystals taking care not to contaminate it with either anhydrous levulose or levulose dihydrate crystals. After agitating for a short period of time, say, about one-half hour, to permit crystallization of ice, the ice is removed by filtration or centrifugation leaving a solution of increased levulose concentration. This process may be repeated if necessary to obtain the desired concentration of levulose required for further crystallization thereof. To apply the second method, the mother liquor is cooled to below the eutectic temperature, say, to about minus 10° C. to about minus 20° C. and seeded with both ice crystals and crystals of levulose dihydrate. As a result, crystallization of both ice and levulose dihydrate occurs—the ice crystals remaining suspended in the liquid while the levulose dihydrate settles to the bottom. The ice-containing solution is then poured off the layer of dihydrate, the ice separated from the solution by filtration or centrifugation and the resulting solution subjected to the same procedure to obtain additional levulose dihydrate. The levulose dihydrate settling to the bottom is removed after each ice crystallization, centrifuged, washed, and dried as set forth above. A variation of this procedure involves allowing the mother liquor to stand at sub-eutectic temperature (about minus 10° to about minus 20° C.) until the entire mass solidifies. The mass is then warmed to a temperature slightly above the eutectic, i. e., to about minus 9° C. whereupon the ice will dissolve rapidly whereas the levulose dihydrate will dissolve slowly, most of it settling to the bottom of the solution. Thus the solution still containing ice crystals is decanted from the layer of levulose dihydrate. The ice crystals are removed by filtration or centrifugation and the resulting solution subjected to the same procedure to obtain additional levulose dihydrate. The levulose dihydrate which settles to the bottom after each crystallization is removed, centrifuged, washed, and dried as set forth above.

The levulose dihydrate crystals are colorless, orthorhombic prisms. They are diamond-shaped in cross section and their length is about 3 to 4 times their width. These crystals can be maintained in their solid, crystalline form if kept at 20° C. or below. Since this compound melts at approximately 21.5° C., it can also be permitted to melt whereupon it yields a levulose solution which contains 1 mole of levulose for each 2 moles of water, i. e., 83.3% levulose. In this form it serves as a suitable sweetening agent for all types of food and beverage products. If anhydrous levulose is desired, the water may be removed from the solution or crystals by application of evaporation procedures such as vacuum drying and so forth.

As set forth above, one step in the isolation procedure is seeding the solution to be crystallized with crystals of levulose dihydrate. This material can be obtained from a previous batch or can be prepared by dissolving pure, anhydrous levulose in water and cooling it to crystallizing temperature. In this operation the concentration of levulose and temperature are the same as in the isolation procedure. Preferably the concentration should be about 65% and the crystallization temperature about minus 7° C. Crystallization may be initiated by adding some anhydrous levulose or by adding glass powder or scratching the sides of the glass vessel in which the solution is contained.

The following examples demonstrate the invention in greater detail. It is understood that these examples are furnished only by way of illustration and not limitation.

*Example I*

The solution used for crystallizing contained 25 grams of levulose, 5 grams of dextrose, and 20 grams of water. This solution was cooled to minus 6.5° C. and seeded with a small amount of powdered levulose dihydrate crystals (about 25 mg.). The mixture was allowed to stand at minus 6.5° C. for 20 hours then the crystalline material separated by filtration, washed, and dried. A yield of 14.4 grams of pure, crystalline levulose dihydrate was obtained (a recovery of 48% of the original levulose).

*Example II*

A solution was prepared containing 60 grams of levulose, 6 grams of dextrose and 34 grams of water. This solution was cooled to minus 6.5° C. and seeded with a small amount (about 25 mg.) of powdered levulose dihydrate crystals. The mixture was allowed to stand at minus 6.5° C., with occasional shaking, for 24 hours. Then the crystalline material was separated by filtration, washed, and dried. A yield of 46 grams of levulose dihydrate was obtained, i. e., a recovery of 64% of the original levulose in solution.

Having thus described the invention, what is claimed is:

1. A process for isolating levulose from a solution thereof which comprises cooling the solution to a temperature not higher than about 20° C., seeding the solution with crystals of levulose dihydrate, allowing levulose dihydrate to crystallize out of solution and separating the crystalline levulose dihydrate from the mother liquor, the concentration of levulose in the solution seeded being sufficiently high to result in said crystallization.

2. A process for isolating levulose from a solution containing in excess of 36% levulose which comprises cooling the solution to a temperature from about 20° C. to about minus 20° C., seeding the solution with crystals of levulose dihydrate, allowing levulose dihydrate to crystallize out of solution and separating the crystalline levulose dihydrate from the mother liquor.

3. A process for isolating levulose from a solution thereof which comprises cooling the solution to a temperature from about 20° C. to about minus 9° C., seeding the solution with crystals of levulose dihydrate, allowing levulose dihydrate to crystallize out of solution, then separating the crystalline levulose dihydrate from the mother liquor, the concentration of levulose in the solution seeded being sufficiently high to result in said crystallization, being in excess of 36%.

4. The process in accordance with claim 3 wherein the mother liquor is re-concentrated by cooling it to a temperature in the range from about minus 10° C. to about minus 20° C., seeding the liquor with ice crystals, allowing ice to crystallize out of solution, then separating the ice thus to prepare a solution of increased levulose concentration.

5. The process in accordance with claim 3 wherein additional levulose dihydrate is recovered from the mother liquor by cooling it to a temperature in the range from about minus 10° C. to about minus 20° C., seeding it with crystals of ice and crystals of levulose dihydrate, permitting both ice and levulose dihydrate to crystallize out of solution and recovering the levulose dihydrate which settles out of solution.

6. The process in accordance with claim 3 wherein additional levulose dihydrate is recovered from the mother liquor by cooling it in the range from about minus 10° C. to about minus 20° C., seeding it with crystals of ice and crystals of levulose dihydrate, allowing the mass to stand until crystallization is complete, then warming the crystallized mass and recovering the levulose dihydrate which settles out of solution.

7. A process for isolating levulose from a solution containing levulose and dextrose which comprises cooling the solution to a temperature from about 20° C. to about minus 9° C., seeding the solution with crystals of levulose dihydrate, allowing levulose dihydrate to crystallize out of solution and separating the crystalline levulose dihydrate from the mother liquor, the concentration of levulose in the solution seeded being sufficiently high to result in said crystallization.

8. A process for isolating levulose from a solution containing in excess of 36% levulose and not over 18% dextrose which comprises cooling the solution to a temperature from about 20° C. to about minus 9° C., seeding the solution with crystals of levulose dihydrate, allowing the levulose dihydrate to crystallize out of solution, and separating the crystalline levulose dihydrate from the mother liquor.

9. A process for isolating levulose from a solution containing in excess of 36% levulose and not over 18% dextrose which comprises cooling the solution to a temperature from about minus 5° C. to about minus 9° C., seeding the solution with crystals of levulose, allowing the levulose dihydrate to crystallize out of solution and separating the crystalline levulose dihydrate from the mother liquor.

10. Process in accordance with claim 9 wherein the mother liquor is concentrated to raise the levulose concentration to over 36% and the crystallization process repeated, said concentration and said crystallization being repeated until the dextrose content of the solution is over 18%.

11. Process of isolating levulose from invert sugar which comprises forming a solution of invert sugar and subjecting this solution to concentration and refining steps to obtain a solution containing over 36.5% levulose and less than 18% dextrose, cooling this solution to a temperature from about minus 5° C. to about minus 9° C., seeding the solution with crystals of levulose dihydrate, allowing the levulose dihydrate to crystallize out of solution and separating the crystalline levulose dihydrate from the mother liquor.

12. Process in accordance with claim 11 wherein the mother liquor is concentrated to raise the levulose concentration to over 36.5% and the crystallization process repeated, said concentration and crystallization being repeated until the dextrose content of the solution is over 18%.

13. A process for concentrating an aqueous solution containing levulose which comprises cooling the solution to a temperature within the range from about minus 10° C. to about minus 20° C., seeding the solution with ice crystals, allowing ice to crystallize out of solution, then separating the ice thus to prepare a solution having an increased concentration of levulose.

14. A process for isolating levulose from a solution containing in excess of 36% levulose which comprises cooling the solution to a temperature in the range from about minus 10° C. to about minus 20° C., seeding the solution with crystals of ice and crystals of levulose dihydrate, permitting both ice and levulose dihydrate to crystallize out of solution and recovering the levulose dihydrate which settles out of the solution.

15. A process for isolating levulose from a solution containing in excess of 36% levulose which comprises cooling the solution to a temperature in the range from about minus 10° C. to about minus 20° C., seeding the solution with crystals of ice and crystals of levulose, allowing the mass to stand at this temperature range until crystallization is complete, then warming the crystallized mass and recovering the levulose dihydrate which settles out of solution.

16. Crystalline levulose dihydrate.

17. The new compound: orthorhombic crystalline levulose dihydrate, which melts at about 21.5° C., yielding upon melting a levulose solution containing one molecule of levulose for each two moles of water.

FRANK E. YOUNG.
FRANCIS T. JONES.

REFERENCES CITED

The following references are of record in the file of this patent:

UNITED STATES PATENTS

| Number | Name | Date |
|---|---|---|
| 2,007,971 | Jackson | July 16, 1935 |

OTHER REFERENCES

Mackenzie: "Sugars and Their Simple Derivatives," 1913, page 182, 1 page.